United States Patent
Asakura et al.

(10) Patent No.: US 7,443,626 B2
(45) Date of Patent: Oct. 28, 2008

(54) PATTERNED DISK MEDIUM FOR VERTICAL MAGNETIC RECORDING, AND MAGNETIC DISK DRIVE WITH THE MEDIUM

(75) Inventors: Makoto Asakura, Tokyo (JP); Yoichiro Tanaka, Kawasaki (JP); Akira Kikitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 11/181,958

(22) Filed: Jul. 15, 2005

(65) Prior Publication Data

US 2006/0012903 A1   Jan. 19, 2006

(30) Foreign Application Priority Data

Jul. 16, 2004   (JP)   ............... 2004-210463

(51) Int. Cl.
*G11B 15/14* (2006.01)

(52) U.S. Cl. ............... 360/64; 360/48; 360/51; 360/61; 360/77.02

(58) Field of Classification Search .............. None
See application file for complete search history.

(56) References Cited

U.S. PATENT DOCUMENTS

| | | | | |
|---|---|---|---|---|
| 3,753,252 | A | * | 8/1973 | Tietze ............... 360/135 |
| 4,805,065 | A | | 2/1989 | Jagannathan et al. |
| 4,912,585 | A | | 3/1990 | Belser et al. |
| 5,138,511 | A | | 8/1992 | Hoshimi et al. |
| 6,490,111 | B1 | * | 12/2002 | Sacks ............... 360/53 |
| 6,747,823 | B2 | * | 6/2004 | Saito et al. ............... 360/17 |
| 6,805,966 | B1 | * | 10/2004 | Formato et al. ............... 428/457 |
| 6,829,201 | B2 | * | 12/2004 | Nishikawa et al. ....... 369/13.38 |
| 6,950,252 | B2 | * | 9/2005 | Nishikawa et al. ............... 360/17 |
| 6,999,279 | B2 | * | 2/2006 | Lundstrom ............... 360/131 |
| 7,036,209 | B1 | * | 5/2006 | Wago et al. ............... 29/603.2 |
| 7,079,340 | B2 | * | 7/2006 | Igaki et al. ............... 360/39 |

(Continued)

FOREIGN PATENT DOCUMENTS

CN   1467710 A   1/2004

(Continued)

OTHER PUBLICATIONS

Chinese Office Action dated Dec. 1, 2006 for Appln. No. 200510084627.0.

(Continued)

*Primary Examiner*—Hoa T Nguyen
(74) *Attorney, Agent, or Firm*—Pillsbury Winthrop Shaw Pittman, LLP

(57) ABSTRACT

A patterned disk medium includes a disk-shaped flat substrate including a first surface and a second surface located an opposite side of the first surface. First servo pattern areas including portions provided with magnetic members and portions provided with no magnetic members are provided on the first surface. Second servo pattern areas including portions provided with magnetic members and portions provided with no magnetic members are provided on the second surface. The magnetic members of the first and second servo pattern areas are magnetized in a direction perpendicular to the first and second surfaces. The magnetic polarity of the surfaces of the magnetic members of the second pattern areas differs from that of the surfaces of the magnetic members of the first pattern areas.

2 Claims, 6 Drawing Sheets

U.S. PATENT DOCUMENTS

| | | |
|---|---|---|
| 2002/0171957 A1 | 11/2002 | Komatsu et al. |
| 2002/0171958 A1 | 11/2002 | Komatsu et al. |
| 2003/0231417 A1* | 12/2003 | Hamaguchi et al. ........... 360/17 |
| 2004/0080871 A1* | 4/2004 | Usa et al. .................... 360/135 |

FOREIGN PATENT DOCUMENTS

| | | |
|---|---|---|
| EP | 0 136 157 A2 | 4/1985 |
| EP | 0 406 726 A2 | 1/1991 |
| JP | 09-054946 A | 2/1997 |
| JP | 2003-022634 A | 1/2003 |

OTHER PUBLICATIONS

Australian Search Report dated Mar. 6, 2006 for Singapore Appln. No. 200504061-3.

* cited by examiner

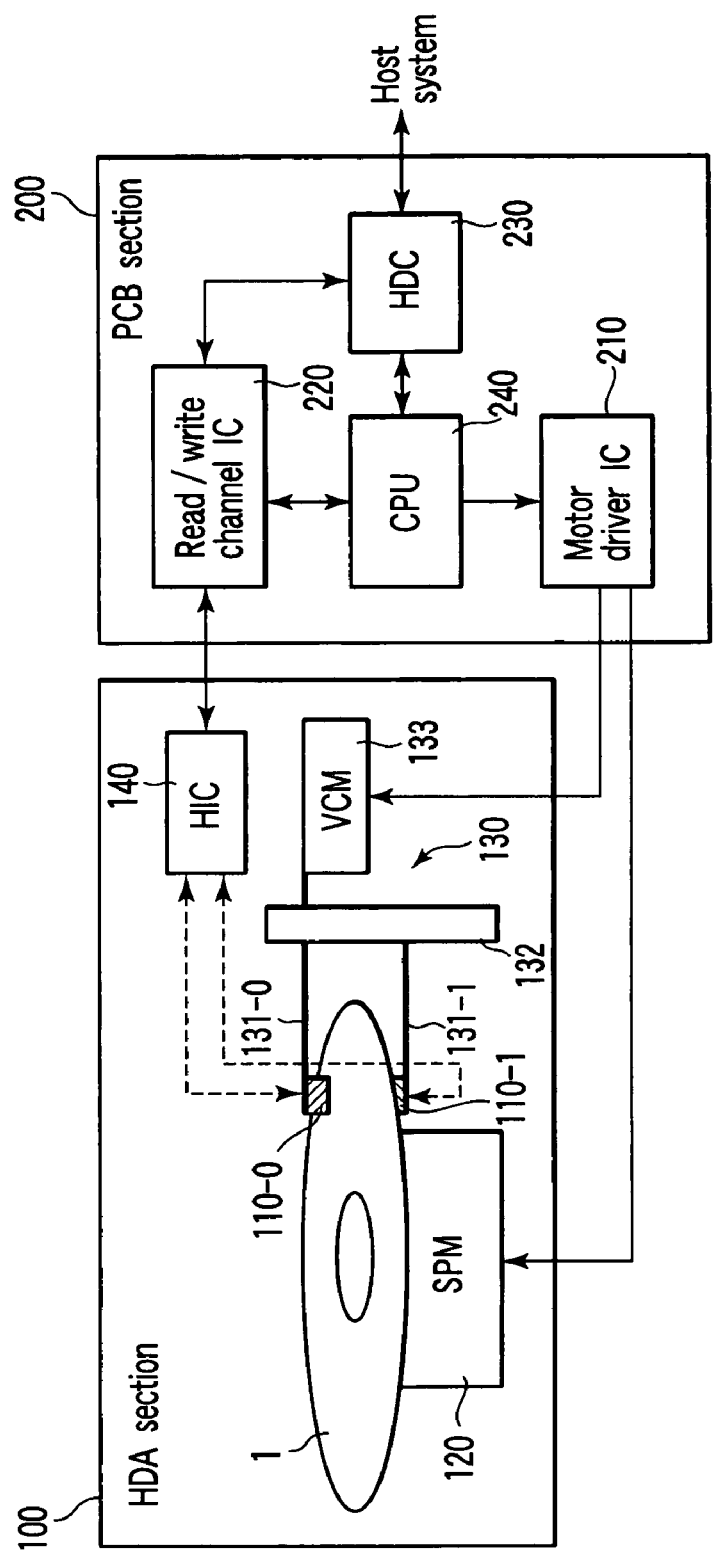
F I G. 5

PATTERNED DISK MEDIUM FOR VERTICAL MAGNETIC RECORDING, AND MAGNETIC DISK DRIVE WITH THE MEDIUM

CROSS-REFERENCE TO RELATED APPLICATIONS

This application is based upon and claims the benefit of priority from prior Japanese Patent Application No. 2004-210463, filed Jul. 16, 2004, the entire contents of which are incorporated herein by reference.

BACKGROUND OF THE INVENTION

1. Field of the Invention

The present invention relates to a patterned disk medium for vertical magnetic recording, in which servo pattern areas each including a plurality of magnetic members are provided on each surface of a disk-shaped substrate. More particularly, the invention relates to a patterned disk medium for vertical magnetic recording, in which magnetic members included in servo pattern areas on each surface of a disk-shaped substrate are magnetized in a direction vertical to each surface. The invention also relates to a magnetic disk drive provided with the patterned disk medium.

2. Description of the Related Art

In general, servo information is beforehand, or at the initialization of a magnetic disk drive, recorded on a disk-shaped magnetic recording medium (disk medium) installed in the drive. Servo information includes position information necessary to position the head at a target position on the disk medium. The area recording servo information is called a servo area.

Jpn. Pat. Appln. KOKAI Publication No. 2003-22634 (prior art document 1) describes a technique related to a patterned disk medium. The patterned disk medium is a magnetic disk medium in which a servo pattern in each servo area (servo zone) is pre-provided as an irregular surface pattern formed of a magnetic layer. Prior art document 1 also discloses a so-called discrete track recording (DTR) technique for forming data tracks also using patterns, and forming grooves along the tracks. DTR is a magnetic recording technique expected to be able to improve the error rate in each data area and increase the surface recording density.

A servo pattern cannot be used as servo information if it is merely formed of an irregular pattern on a substrate with a magnetic surface layer. To realize a servo pattern usable as servo information, an initialization process for reliably magnetizing the pattern is required. Prior art document 1 discloses the following two-stage magnetization method.

Firstly, while the patterned disk medium is rotated, the magnetizing head is moved between the outer periphery and inner periphery of the disk medium. In this state, the head generates a ferromagnetic field in a first direction (first magnetic field). As a result, the magnetic layers provided on the concave and convex portions of the disk medium (i.e., the entire surface of the disk medium) are magnetized in the first direction. Subsequently, while the disk medium is again rotated, the head is again moved between the outer periphery and inner periphery of the disk medium. In this state, the head generates a magnetic field (second magnetic field) in a second direction opposite to the first direction. The second magnetic field is as weak as little influences the concave portions of the disk medium. Because of the second magnetic field, the magnetization of the magnetic layer on each convex portion of the disk medium is reversed. Thus, only the convex portions of the disk medium are magnetized in the second direction.

Another two-stage magnetization method is disclosed in Jpn. Pat. Appln. KOKAI Publication No. 9-54946 (prior art document 2). The patterned disk medium described in this document employs longitudinal recording, and is a disk-shaped magnetic recording medium in which an irregular magnetic layer is formed on the surface. In the two-stage magnetization method of the prior art document 2, a magnetizing unit generates a magnetic field (first magnetic field) in a first direction, using a large direct current (DC). As a result, the magnetization of the concave and convex portions of the disk medium is adjusted to the first direction.

After that, the magnetizing unit again generates a magnetic field in a second direction opposite to the first direction, utilizing as weak DC current as little influences the concave portions. Because of the magnetic field in the second direction (second magnetic field), only the convex portions of the disk medium are magnetized in the second direction.

Yet another two-stage magnetization method is disclosed in Jpn. Pat. Appln. KOKAI Publication No. 2004-22056 (prior art document 3). The two-stage magnetization method described in document 3 is used for a double-sided vertical magnetic recording medium (double-sided vertical magnetic disk medium). In this method, firstly, flat magnetic layers formed on both surfaces of the disk medium are magnetized in one direction by an external magnetic field that can penetrate both magnetic layers. The surface magnetic polarity of one magnetic layer differs from that of the other layer. Subsequently, using first and second mask members, the signal patterns of these mask mediums are transferred to the magnetic layers (first and second magnetic films) provided on the respective surfaces of the disk medium. Each of the first and second mask members includes magnetic regions corresponding to the to-be-transferred signal pattern.

In the two-stage magnetization method described in prior art document 1 or 2, when the entire surface of the disk medium is magnetized in the first direction, the following problem is raised because of wide magnetic spacing. Even if a large head is used for magnetization, only a weaker magnetic field than a recording magnetic field generated by the head of the magnetic disk drive may be applied to the concave portions of the magnetic layers of the disk medium. In the two-stage magnetization method, after the entire surface of the disk medium is magnetized in the first direction, a magnetic field of a strength that does not influence the concave portions of the disk medium is generated in the second direction. However, it is not always easy to reliably reverse the magnetization of only the convex portions of the magnetic layers of the disk medium.

On the other hand, in the two-stage magnetization method described in prior art document 3, both surfaces of the double-sided vertical magnetic disk medium are magnetized by the external magnetic field that can penetrate both surfaces. In this case, a sufficient strong magnetic field can be applied to the magnetic layers on both surfaces of the magnetic disk medium, compared to prior art documents 1 and 2. However, at the second stage in the two-stage magnetization method of prior art document 3, the first and second mask members must be used to transfer their signal patterns to the magnetic layers (first and second magnetic films) on both surfaces of the magnetic disk medium.

BRIEF SUMMARY OF THE INVENTION

In accordance with an embodiment of the invention, there is provided a patterned disk medium for vertical magnetic recording. This patterned disk medium comprises: a disk-shaped flat substrate including a first surface and a second surface located an opposite side of the first surface; first servo pattern areas provided on the first surface of the substrate and each including portions provided with magnetic members and portions provided with no magnetic members, the magnetic members of the first servo pattern areas being magnetized in a direction perpendicular to the first surface and the second surface; and second servo pattern areas provided on the second surface of the substrate and each including portions provided with magnetic members and portions provided with no magnetic members, the magnetic members of the second servo pattern areas being magnetized in a same direction as the direction of magnetization of the magnetic members of the first servo pattern areas, a magnetic polarity of surfaces of the magnetic members of the second pattern areas being different from a magnetic polarity of surfaces of the magnetic members of the first pattern areas.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a block diagram illustrating the structure of a magnetic disk drive with the disk medium 1 installed therein;

DETAILED DESCRIPTION OF THE INVENTION

An embodiment of the invention will be described with reference to the accompanying drawings.

[Outline of Pattern of Patterned Disk Medium for Double-side Vertical Magnetic Recording]

Figure 1:
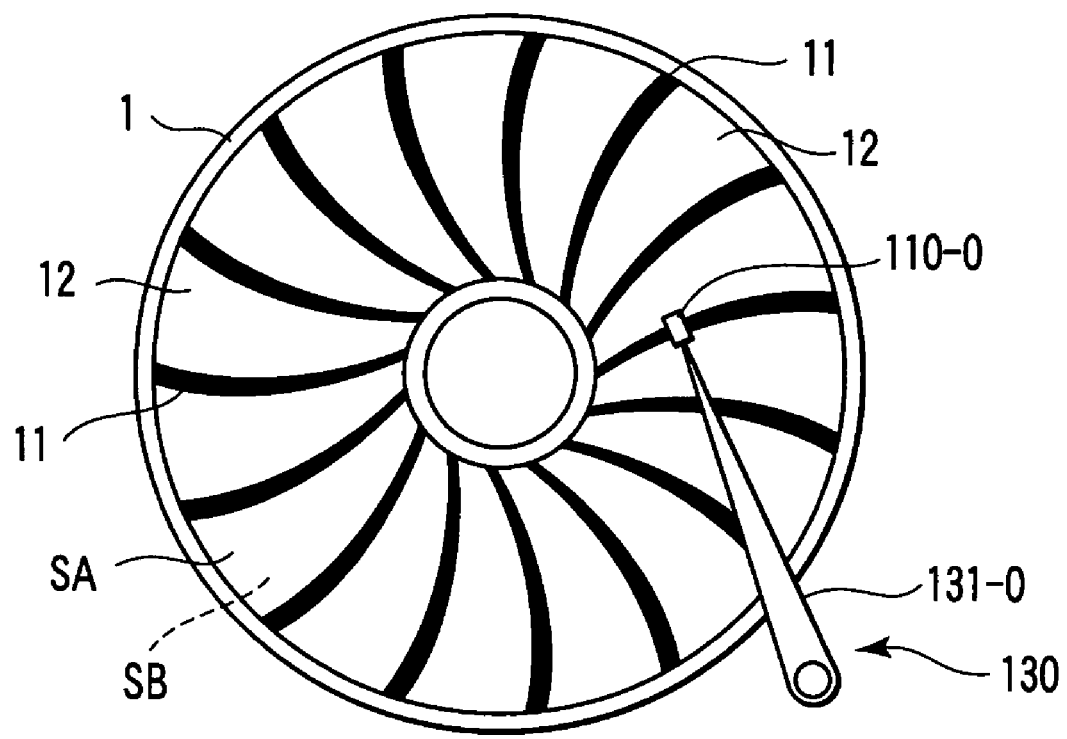
FIG. 1 is a schematic plan view illustrating the pattern structure of a patterned disk medium 1 for double-side vertical magnetic recording according to an embodiment of the invention.

FIG. 1 is a schematic plan view illustrating the pattern structure of a patterned disk medium 1 for double-side vertical magnetic recording according to an embodiment of the invention. The disk medium 1 is a small-diameter (e.g., 0.85 inches) patterned disk medium. The disk medium 1 has two surfaces, i.e., the upper surface (first surface) SA, and the lower surface (second surface) SB (see FIG. 3). As shown in FIG. 1, a plurality of arcuate servo areas (servo pattern areas) 11 are formed on the surface SA of the disk medium 1 at circumferentially regular intervals. The arc of each arcuate servo area corresponds to the locus (head access locus) of a head 110-0, incorporated in the drive, assumed when the head is moved above the disk medium 1. The length (width) of each servo area 11 along the circumference of the disk medium 1 is set to be proportional to the radial position on the disk medium 1. Further, servo areas similar to the servo areas 11 are formed on the surface SB of the disk medium 1, although they are not shown. The servo areas 11 on the surface SA are arranged mirror-symmetrical with respect to the servo areas on the surface SB. Namely, the disk medium 1 has an obverse surface and reverse surface.

As will be described later, the disk medium 1 includes a flat substrate (glass substrate) 10 having two surfaces 10A and 10B (see FIG. 3). The surfaces 10A and 10B of the substrate 10 have substrate layers 2A and 2B formed thereon, respectively. Magnetic members serving as a recording layer (magnetic layer) and arranged in a certain pattern are formed on each of the substrate layers 2A and 2B. Each servo area 11 is formed of part of the recording layer.

The surface SA of the disk medium 1 will now be described. Since the surface SB has the same structure as the surface SA, it will not be described. The servo areas 11 on the surface SA of the disk medium 1 are arranged at circumferentially regular intervals to circumferentially equally divide the surface SA. The surface SA of the disk medium 1 is divided by the servo areas 11 into the same number of sectors (servo sectors) as that of the areas 11. In FIG. 1, the surface SA is divided into 15 servo sectors for facilitating the description. Actually, however, it is divided into 100 or more servo sectors.

On the surface SA of the disk medium 1, the area held between each pair of adjacent servo areas 11 is called a data area 12. Each data area 12 is generally used to record/reproduce user data. In the embodiment, the disk medium 1 is a patterned disk medium of a discrete track recording (DTR) type. Accordingly, the data areas 12 of the disk medium 1 beforehand include a plurality of annular tracks (not shown) concentrically formed with a certain pitch (track pitch Tp).

Magnetic tracks are called discrete tracks (DT). User data is recorded as a magnetization pattern on the magnetic tracks. The magnetic tracks are formed of a ferromagnetic material (e.g., CoCrPt) serving as the recording layer (magnetic layer), and provided as annular projections on the substrate layer 2A (see FIG. 3) of the substrate 10. A convex non-magnetic section that cannot record data and is called a non-magnetic guard is provided between each pair of adjacent tracks. Thus, the annular magnetic tracks are concentrically arranged on the disk medium 1 so that the magnetic property is radially segmented. Each data area 12 is formed of a pattern in which the magnetic tracks are arranged with a certain pitch, with non-magnetic portions interposed therebetween. In the disk medium 1 of the DTR type constructed as the above, each magnetic track is prevented from being significantly influenced by adjacent tracks, which contributes to an increase in the recording density of the disk medium 1.

As described above, the surface SA of the disk medium 1 is divided into the same number of servo sectors as that of the servo areas 11 by the servo areas 11. This means that each magnetic track on the surface SA is divided into the same number of servo sectors as that of the servo areas 11 by the servo areas 11 in the circumferential direction of the disk medium 1. Further, note that each data area 12 is not necessarily patterned.

[Servo Pattern Structure]

Figure 2A:
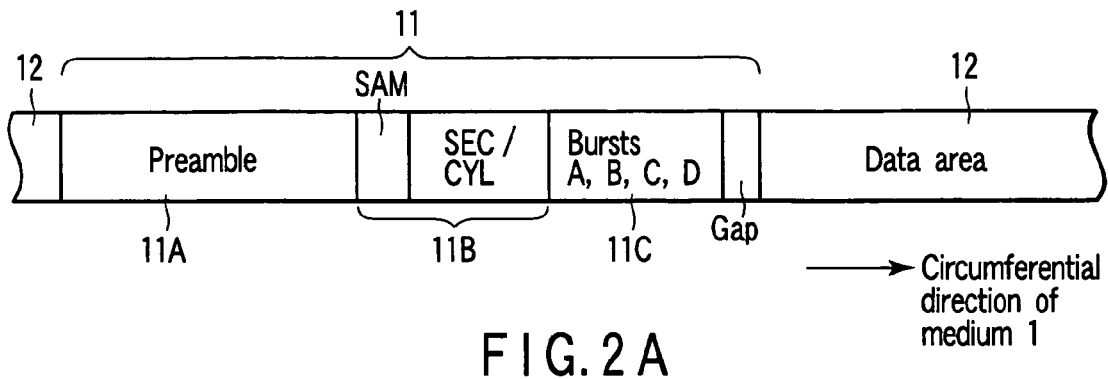
FIG. 2A is a view illustrating the format of a servo area 11 appearing in FIG. 1.
Figure 2B:
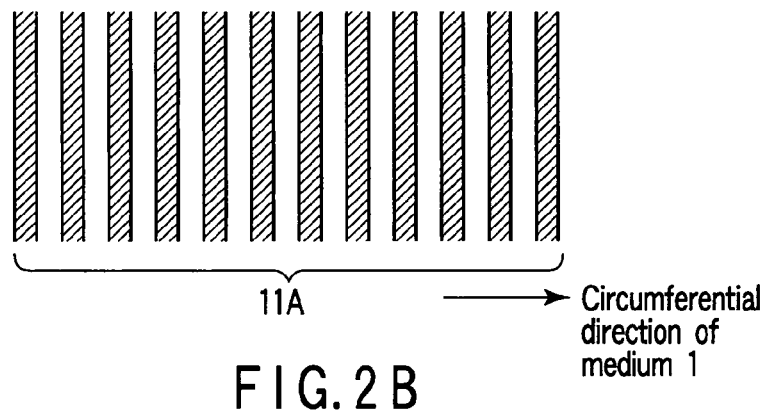
FIG. 2B is a view illustrating the pattern structure of the preamble section 11A of the servo area 11 appearing in FIG. 2A.
Figure 2C:
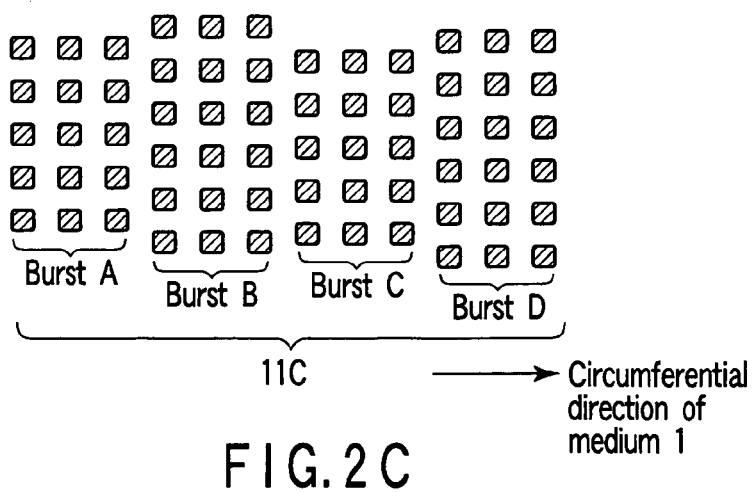
FIG. 2C is a view illustrating the pattern structure of the burst section 11C of the servo area 11 appearing in FIG. 2A.

FIG. 2A is a view illustrating the format of each servo area 11. Further, FIGS. 2B and 2C show the pattern structures of the preamble section 11A and burst section 11C of the servo area 11 appearing in FIG. 2A, respectively. The format of FIG. 2A and the patterns of FIGS. 2B and 2C show an upper surface SA side portion of the disk medium 1, on which the head of the disk drive passes from left to right in the figures when the disk medium 1 is installed in the disk drive.

Each servo area 11 is a pre-bit area in which a pattern of magnetic sections and non-magnetic sections indicating servo information necessary for head positioning is embedded. As shown in FIG. 2A, each servo area 11 mainly comprises a preamble section 11A, address section 11B and burst section 11C. Each servo area 11 is constructed so that the known servo information recorded pattern (servo pattern) is beforehand formed (pre-bit formed) to make each magnetic portion and non-magnetic portion correspond to "1" and "0", respectively. The contents of the preamble section 11A, address section 11B and burst section 11C will be described briefly.

The preamble section 11A is provided for performing a phase lock loop (PLL) process, automatic gain control (AGC) process, etc. The PLL process is executed to synchronize a servo information (servo signal) reproduction clock signal with the media pattern cycle, thereby compensating an error due to, for example, the runout of the disk medium 1. The AGC process is executed to keep the amplitude of a reproduction signal to an appropriate level. The preamble section 11A is formed of the vertically striped pattern shown in FIG. 2B, in which stripes are radially extended, and are isolated from each other in the circumferential direction of the disk medium 1. In this case, the hatched portions indicate non-magnetic portions (concave portions), and non-hatched portions indicate magnetic portions (convex portions). Alternatively, the striped pattern may be constructed such that the hatched portions indicate magnetic portions (convex portions), and non-hatched portions indicate non-magnetic portions (concave portions). In the embodiment, the circumferential width of each magnetic portion of the preamble section 11A is set substantially 50% of the stripe pitch of the entire preamble section 11A.

The address section 11B is formed of a pattern called a Manchester code. The pattern of the address section 11B is constructed such that "1" and "0" indicate a magnetic portion and non-magnetic portion, respectively. The pattern of the address section 11B includes a servo area identification code called a servo address mark (SAM), sector information (SEC) and cylinder information (CYL), etc. The information of the address section 11B other than the cylinder information is common to all portions of each sector, and is therefore formed of a vertically striped pattern similar to that of the preamble section 11A. In this vertically striped pattern, however, the arrangement of the magnetic/non-magnetic portions is not uniform in stripe pitch.

On the other hand, the cylinder information is formed of a pattern that varies in the arrangement of magnetic members between the servo tracks. Therefore, in the pattern indicating the cylinder information, breaks in magnetism occur in the radial direction of the disk medium 1. Specifically, the cylinder information is formed of a pattern acquired by, for example, converting the cylinder address into a gray code and then expressing the gray code by a Manchester code. As well known, gray codes are used to minimize the influence of address misreading during a seek operation. In a gray code into which a cylinder address is converted, the number of bits, by which information varies between adjacent servo tracks, is minimum (1 bit). Accordingly, in the pattern indicating the cylinder information, the closer to the least significant bit (LSB), the higher the frequency of breaks in magnetism. Further, this pattern has symmetry in the radial direction of the disk medium 1.

The burst section 11C is an off-track detection area used to detect the deviation (off-track quantity) of the head from a target position (on-track position) corresponding to a target track. In the burst section 11C, four marks acquired by shifting the phase of a certain pattern in the radial direction of the disk medium 1 are formed. The four marks are called bursts A, B, C and D. Such a pattern as shown in FIG. 2C, in which a plurality of marks are arranged in the circumferential direction of the disk medium 1 with the same array pitch as employed in the preamble section 11A, is used for the burst section 11C. The radial array pitch of the pattern of the burst section 11C is set to a value proportional to the pitch of the address pattern change of the address section 11B. Namely, the radial array pitch of the pattern of the burst section 11C is set to a value proportional to the pitch of the servo tracks. In FIG. 2C, to facilitate the drawing, bursts A, B, C and D of the burst section 11C each include three magnetic members in the circumferential direction of the disk medium 1. Actually, however, burst A, B, C and D each include, for example, ten magnetic members in the circumferential direction of the disk medium 1, and these ten magnetic members are repeatedly arranged in the radial direction of the disk medium 1 with a pitch twice the pitch of the servo tracks. The off-track quantity is determined by calculating the average amplitude of the reproduction signals of the bursts A, B, C and D. In the embodiment, the burst section 11C is formed of a pattern (burst pattern) including the bursts A, B, C and D. However, a pattern other than the burst pattern, such as a known phase difference servo pattern, may be used for the burst section 11C. It is sufficient if the pattern can be used to detect the off-track quantity.

[Sectional Structure and Magnetization Direction of Disk Medium 1]

Figure 3:
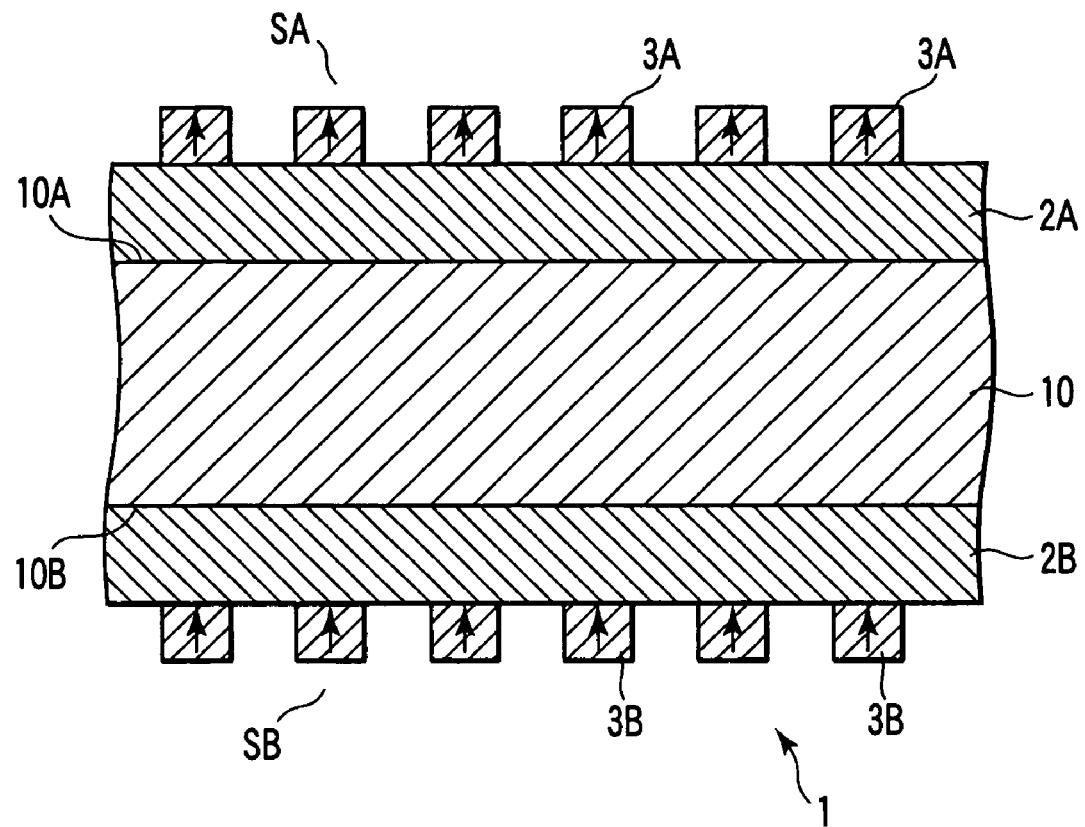
FIG. 3 is a sectional view of the disk medium 1.

FIG. 3 shows the section of the disk medium 1. As shown in FIG. 3, the disk medium 1 includes the flat glass substrate 10. The substrate 10 includes the surfaces 10A and 10B. The surfaces 10A and 10B have the substrate layers (SUL) 2A and 2B formed thereon, respectively. The substrate layers 2A and 2B include respective soft magnetic layers (high magnetic permeability layers). Magnetic members 3A and 3B patterned as projections and used as recording layers are provided on the substrate layer 2A and 2B, respectively. The magnetic members 3A and 3B are formed of a ferromagnetic substance having vertical magnetic anisotropy (e.g., CoCrPt). A diamond-like carbon (DLC) protection film (protection layer), not shown, is formed on each of the surfaces SA and SB of the disk medium 1, and is coated with a lubricant. The substrate 10 may not necessarily be formed of glass. It is sufficient if the substrate 10 is a non-magnetic one, and may be formed of, for example, aluminum. Further, the magnetic (ferromagnetic) members 3A and 3B may not necessarily be formed of a CoCrPt-based material, but may be formed of another ferromagnetic substance having vertical magnetic anisotropy, such as an FePt-based ferromagnetic substance. The surfaces SA and SB of the disk medium 1 have irregularities that reflect the existence and non-existence of the magnetic members. However, the surfaces SA and SB may be flattened by filling the concave portions with a non-magnetic substance such as $SiO_2$.

In FIG. 3, arrow "↑" is written on the magnetic members 3A and 3B patterned on the disk medium 1. Arrow "↑" indicates the direction of magnetization in the magnetic members 3A and 3B. In the embodiment, the magnetic members 3A and 3B are magnetized in the direction, indicated by arrow "↑", by a magnetization process performed on the disk medium 1 after it is produced. In this case, the magnetic members 3A and 3B are magnetized so that the tip of arrow "↑" indicates the N pole, and the bottom of arrow "↑" indicates the S pole.

[Outline of Disk Medium Manufacturing Method]

A brief description will be given of a method for manufacturing the patterned disk medium 1. This method comprises a transfer process, magnetic material working process and finish process. Firstly, a method for producing a stamper used in the transfer process will be described. The stamper producing process is divided into the steps of pattern drawing, development and electrotyping, and a finish step. In the pattern-drawing step, portions of a magnetic disk medium that should be made non-magnetic are drawn by exposure on a resist-coated master plate. This exposure drawing is performed on the entire master plate from the inner periphery to the outer periphery, using an exposure apparatus for applying an electron beam to the master plate while rotating the plate.

In the development step, the resist on the master plate acquired after exposure drawing is developed. The resultant master plate is subjected to, for example, reactive ion etching (RIE), thereby imparting a pattern with concave and convex portions to the master plate. In the electrotyping step, the master plate with the pattern with concave and convex portions is subjected to an electrical conduction process, thereby electrotyping nickel (Ni) on the surface of the master plate. From the master plate with Ni, an Ni plate having the pattern with concave and convex portions is peeled. Lastly, a disk stamper of Ni is formed by making the Ni plate to have inner and outer diameters in a punching process. Using this stamper, the patterned disk medium 1 is produced. In the embodiment, the convex portions of the stamper correspond to portions of the disk medium 1 that are to be made non-magnetic. As mentioned above, the disk medium 1 has two surfaces. Accordingly, to manufacture the disk medium 1, two mirror-symmetric stampers are needed for the respective surfaces.

In the transfer process included in the disk medium manufacturing process, an imprint apparatus of a double-side simultaneous transfer type is used to perform transfer by imprint lithography in the following manner. Firstly, the opposite surfaces of a vertical magnetic recording disk substrate are coated with a resist. The vertical magnetic recording disk substrate means the substrate 10 as shown in FIG. 3 in which magnetic layers having vertical magnetic anisotropy are formed on the entire substrate layers 2A and 2B that are provided on the opposite surfaces of the substrate (glass substrate) 10. A hole is formed in the center of the vertical magnetic recording disk substrate, through which the shaft of a spindle motor, described later, is inserted. Using this hole, the vertical magnetic recording disk substrate is chucked and held between the two stampers for the respective surfaces. In this state, the entire surfaces of the disk substrate are uniformly pressed by the stampers, whereby convex and concave portions of the two stampers are transferred to the resist surfaces of the disk substrate. Resulting from this transfer process, the portions to be made non-magnetic are formed as the concave resist portions.

In the next magnetic material working process, the concave resist portions are removed, whereby surface portions of the magnetic layer that are to be made non-magnetic are exposed. In this state, the resist is left as convex resist portions on the portions to be left as the magnetic members 3A and 3B shown in FIG. 3. Using these convex resist portions as guard layers, the opposite surfaces of the disk substrate are subjected to ion milling, thereby removing only the magnetic portions located at the concave portions. Thus, the magnetic members 3A and 3B arranged in a desired pattern, as shown in FIG. 3, are formed. In the finish process, respective DLC protective layers are provided on the opposite surface of the disk substrate on which the magnetic members 3A and 3B are formed, and are coated with a lubricant. This is the completion of the disk medium 1. At this stage, however, the magnetic members 3A and 3B of the disk medium 1 are not yet magnetized, therefore it is necessary to magnetize them by a media magnetization method described below.

[Media Magnetization Method]

Figure 4:
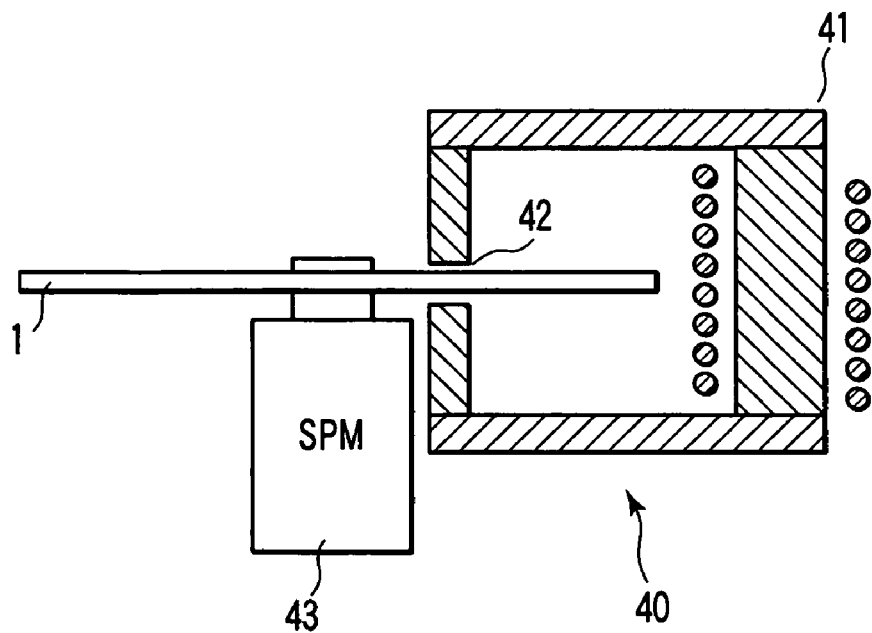
FIG. 4 is a schematic sectional view illustrating the structure of a magnetization apparatus 40 used to initialize the disk medium 1.

A media magnetization method will be described. FIG. 4 is a schematic sectional view illustrating the structure of a dedicated magnetization apparatus 40 used to initialize (magnetize) the disk medium 1. The magnetization apparatus 40 is used to magnetize the magnetic members 3A and 3B patterned as concave portions on the disk medium 1. The magnetization apparatus 40 has an enormous electromagnetic coil 41 for generating a strong magnetic field. An air gap 42 is formed in the top of the electromagnetic coil 41. The magnetization apparatus 40 also has a spindle motor (SPM) 43 for rotating the disk medium 1. During magnetization, the disk medium 1 is chucked by the SPM 43 so that part of the disk medium 1 is positioned in the air gap 42.

Assume here that part of the disk medium 1 is positioned in the air gap 42. In this state, when a DC current is supplied to the electromagnetic coil 41, the coil 41 generates a strong DC magnetic field. As a result, in the air gap 42, the DC magnetic field is applied to the disk medium 1 substantially perpendicularly to the surfaces of the disk medium 1. This magnetic field is an external magnetic field that can penetrate both surfaces SA and SB. Such an external magnetic field as this will hereinafter be referred to as "a double-side penetration type external magnetic field". At this time, the disk medium 1 is rotated by the SPM 43, and the magnetic members 3A and 3B included in an annular area of the same radial position are magnetized in a direction perpendicular to the surfaces SA and SB of the disk medium 1 (in this case, in the direction indicated by arrow "↑" in FIG. 3).

In the embodiment, the electromagnetic coil 41 is supported by an actuator, such as a linear motor (not shown), so that it can move in a direction parallel to the surfaces SA and SB of the disk medium 1. While the disk medium 1 is rotated by the SPM 43, the electromagnetic coil 41 applies a DC magnetic field to the disk medium 1 in a direction perpendicular to the surfaces SA and SB. In this state, the electromagnetic coil 41 is reciprocated over the surfaces SA and SB between a position inside the inner periphery of the disk medium 1 and a position outside the outer periphery of the same, the pattern formed of the magnetic members 3A and 3B extending between the inner and outer peripheries. As a result, the entire surfaces of the disk medium 1 are scanned by the air gap 42 of the electromagnetic coil 41, and all magnetic members 3A and 3B on the surfaces SA and SB of the disk medium 1 are uniformly magnetized in the direction indicated by arrow "↑" shown in FIG. 3. Accordingly, the magnetic members 3A belonging to the servo areas 11 of the surface 3A and the magnetic members 3B belonging to the servo areas of the surface 3B are also magnetized in the direction indicated by arrow "↑" of FIG. 3. This means that the servo pattern (servo information) of each servo area 11, which includes portions with the magnetic members 3A and portions without them, is initialized. The same can be said of the servo areas on the surface SB of the disk medium 1. Thus, in the embodiment, each servo area on the surfaces SA and SB of the disk medium 1 can be reliably initialized by one initialization (magnetization) process.

The above-described direction of magnetization, i.e., the direction of a leakage flux, is opposite between the surfaces SA and SB of the disk medium 1 when observed from the respective surfaces of the magnetic members 3A on the surface SA and the magnetic members 3B on the surface SB. Namely, the magnetic pole of the surfaces of the magnetic members 3A on the surface SA is opposite to that of the surfaces of the magnetic members 3B on the surface SB. In the example of FIG. 3, the magnetic pole of the surfaces of the magnetic members 3A is N, while that of the surfaces of the magnetic members 3B is S. Note that the above-described disk medium manufacturing process and magnetization (initialization) process, and the disk medium packing process after magnetization are a series of automatic processes, therefore there is no danger of the disk medium being magnetized in a wrong direction (in a direction opposite to that shown in FIG. 3).

ADVANTAGE OF THE EMBODIMENT

In general, if, in a patterned disk medium having each servo pattern formed of embedded magnetic and non-magnetic portions, the magnetic portions do not have the same magnetization property, it is difficult for a disk drive to reproduce servo information from the disk medium. Also in a general vertical magnetic disk medium as described in prior art document 1, a magnetization (initialization) process, in which an external magnetic field is applied to the disk medium, is performed before shipping the disk medium. However, the initialization process of prior art document 1 differs from that of the embodiment in that in the former, the external magnetic field does not penetrate both surfaces of the disk medium. Accordingly, in the former, the flux density of the external magnetic field is significantly weaker than that of the recording head of the disk drive, which makes it difficult to sufficiently magnetize (initialize) the embedded servo patterns. This being so, the prior art patterned disk medium requires, after it is incorporated into the disk drive, initialization of the servo patterns based on, for example, DC erasure using the head of the disk drive.

The external magnetic field may not necessarily be of a media penetration type. Initialization is possible if the intensity of the external magnetic field is increased. In this case, however, to impart the same magnetization property to the upper and lower surfaces of the disk medium, subtle magnetic field intensity adjustment is required. It is also necessary to further accurately control, for example, the magnetic air gap in the apparatus (disk medium initialization apparatus) for initializing the disk medium. Moreover, if, for example, external vibration is exerted on the disk medium initialization apparatus, part of the magnetism of the servo patterns may well disappear, which degrades the yield of disk mediums.

On the other hand, in the initialization process of a disk medium described in prior art document 3, the entire surfaces of the disk medium are magnetized by a double-side penetration type external magnetic field. In this case, however, after magnetization, signal patterns of the first and second mask members must be transferred to the respective magnetic layers (first and second magnetic films) formed on both surfaces of the disk medium.

In contrast, in the embodiment, servo patterns are formed of portions of each surface of the disk medium 1 provided with magnetic members, and portions of each surface provided with no magnetic members. Further, the magnetic members (servo patterns) are reliably magnetized (initialized) simply by the double-side penetration type external magnetic field (the CD magnetic field of the disk medium penetration type). Accordingly, as long as the servo patterns themselves are physically correctly formed, no defects (no servo defects) due to magnetization defects occur, with the result that the servo pattern initialization process, such as a DC erasure process, using the recording head of the disk drive is unnecessary.

In addition, in the embodiment, the upper/lower surfaces of the magnetic disk medium (patterned disk medium) 1 magnetized (initialized) by the double-side penetration type external magnetic field can be checked easily in the following manner. Firstly, assume that the disk medium 1 magnetized (initialized) by the double-side penetration type external magnetic field is installed in the disk drive. In this state, the upper surface (obverse surface) SA of the disk medium 1 opposing the down head of the disk drive has a leakage flux directed toward the down head (N pole). On the other hand, the lower surface (reverse surface) SB of the disk medium 1 opposing the up head of the disk drive has a leakage flux directed away from the down head (S pole). Therefore, the disk medium 1 of the embodiment is also advantageous in that the obverse and reverse surfaces of the medium 1 can be easily determined simply by checking the magnetization direction of at least one surface of the medium 1.

In general, patterned disk mediums, including the disk medium 1 of the embodiment, are provided with arcuate servo areas as shown in FIG. 1. Assume here that each servo area is formed of a pattern (servo pattern) of a high recording density. In this case, each servo area is formed of a striped pattern of about a hundred and several tens of nanometers, which is much shorter than visible light wavelengths (about 400 nm). In this disk medium, even if the servo pattern has an irregular surface, it is difficult to recognize rainbow-colored diffraction. Accordingly, in a general patterned disk medium, it is difficult to discriminate the obverse and reverse surfaces from each other.

When servo tracks are formed with the disk medium installed in the disk drive, which is the obverse or reverse surface of the disk medium does not matter. However, in such a patterned disk medium with servo areas pre-formed thereon as the disk medium 1 of the embodiment, which is the obverse or reverse surface of the disk medium is very important when a head disk assembly (HAD) is assembled. This is because the order of appearance of the previously mentioned signals (preamble section 11A, address section 11B and burst section 11C) in the servo area is important. In the disk medium 1 of the embodiment, the upper surface (obverse surface) SA is the N-pole side, and the lower surface (reverse surface) SB is the S-pole side. Accordingly, in the embodiment, the test for checking which surface is the obverse or reverse surface, performed when a magnetic disk medium delivered in a disk drive manufacturer is installed in a disk drive, can be facilitated since it is sufficient if the direction of the leakage flux of the medium is detected.

[Structure of Magnetic Disk Drive]

The structure of a magnetic disk drive will be described briefly. FIG. 5 is a block diagram illustrating the structure of a magnetic disk drive with the disk medium 1 installed therein. The disk drive mainly comprises a head disk assembly (HDA) section 100 and printed circuit board (PCB) section 200. The HDA section 100 is the main unit of the magnetic disk drive. The HDA section 100 includes the disk medium (patterned disk medium for vertical magnetic recording) 1, a pair of down and up heads 110-0 and 110-1, a spindle motor (SPM) 120, an actuator 130 and a head amplifier IC (HIC) 140.

As described above, the disk medium 1 is a disk medium having its opposite surfaces processed for DTR, i.e., a DTR type patterned disk medium (patterned disk medium for vertical magnetic recording). Since the disk medium 1 has an obverse surface and reverse surface, it is appropriately installed in the disk drive after the obverse and reverse surface thereof are confirmed by the aforementioned obverse/reverse confirming (determining) method. The heads 110-0 and 110-1 are opposed to the upper and lower surfaces SA and SB, respectively. The heads 110-0 and 110-1 are each formed by mounting magnetic head elements having a read element and write element on a slider (ABS) as a head main unit. The read element is, for example, a giant magneto resistive element (GMR). The heads 110-0 and 110-1 are mounted on an actuator 130.

The actuator 130 includes suspension arms 131-0 and 131-1, pivot shaft 132 and voice coil motor (VCM) 133. The suspension arms 131-0 and 131-1 support the heads 110-0 and 110-1, respectively. The pivot shaft 132 supports the suspension arms 131-0 and 131-1 so that they can rotate. The VCM 133 is a driving source for the actuator 130. The VCM 133 imparts torque to the suspension arms 131-0 and 131-1 to cause them to pivot about the pivot shaft 132, thereby radially moving the heads 110-0 and 110-1.

The heads 110-0 and 110-1 are connected to the HIC 140 for amplifying the input/output signals (head signals) of the heads 110-0 and 110-1. The HIC 140 is secured to, for example, a predetermined portion of the actuator 130, and electrically connected to the PCB section 200 via a flexible cable (FPC). However, in FIG. 5, for facilitating the drawing, the HIC 140 is located away from the actuator 130. Thus, in the embodiment, the HIC 140 is provided on the actuator 130 located near the heads 110-0 and 110-1 to reduce the noise (SN) of the head signals. Alternatively, the HIC 140 may be secured to the PCB section 200.

The PCB section 200 mainly comprises four system LSIs, i.e., a motor driver IC 210, read/write channel IC 220, disk controller (HDC) 230 and CPU 240. The motor driver IC 210 drives the SPM 120 at a constant rotational speed. The motor driver IC 210 also supplies the VCM 133 with a current determined from a VCM operation amount designated by the CPU 240, thereby driving the actuator 130.

The read/write channel IC 220 is a device for performing signal processing related to read/write operations. The read/write channel IC 220 is formed of a circuit for performing channel switching of the HIC 140 and processing a recording/reproducing signal to/from each head. The HDC 230 forms an interface between the disk drive and a host system (e.g., a personal computer) using the disk drive.

The CPU 240 is a main controller for the disk drive. The CPU 240 realizes a head positioning control system that utilizes, as servo information, the pattern (servo pattern) of each servo area 11 formed on the disk medium 1. The CPU 240 includes a ROM, RAM, microprocessor (MPU) and digital signal processor (DSP). The ROM stores a control program (firmware program). The CPU 240, more specifically, the MPU of the CPU 240, controls the disk drive in accordance with the control program. The memory area of the RAM is used as, for example, a work area by the CPU 240, more specifically, by the MPU of the CPU. The DSP is a processor formed of a hardware circuit, and used for high-speed processing. Alternatively, the CPU 240 may not have the DSP. In this case, the CPU 240 performs computations corresponding to those of the DSP. Thus, the disk drive shown in FIG. 5 has substantially the same structure as conventional disk drives except for the disk medium 1 installed therein.

[Head Positioning Control System]

Figure 6:
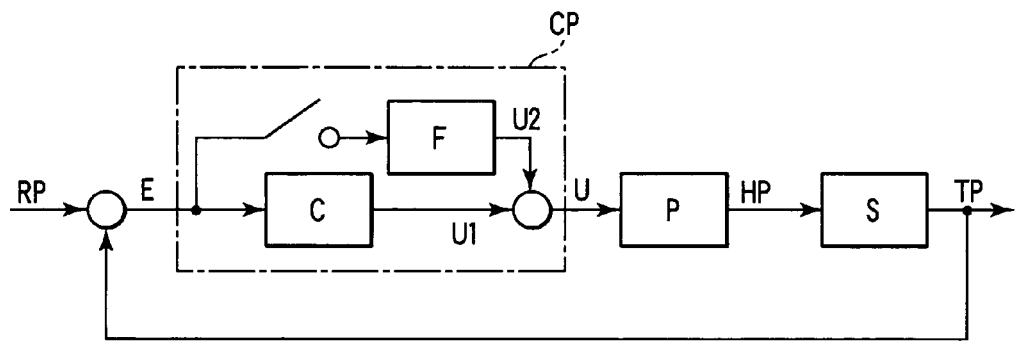
FIG. 6 is a block diagram illustrating a head positioning control system.

A description will now be mainly given of the configuration of the head positioning control system realized by the CPU 240 appearing in FIG. 5. FIG. 6 is a block diagram illustrating the configuration of the head positioning control system. In FIG. 6, reference symbols C, F, P and S denote the transmission functions of the system. A controlled object P specifically corresponds to the actuator 130 including the VCM 133. A signal-processing unit S is specifically realized by the read/write channel IC 220 and CPU 240. Part of off-track quantity detection processing is executed by the CPU 240.

A control process unit CP comprises a feedback control unit C as a first controller and a runout suppression/compensation unit F. The control process unit CP is specifically realized by the CPU 240. The signal-processing unit S generates position information indicating the position of the head 110-$i$ ($i$=0, 1), i.e., a present track position (TP) on the disk medium 1 corresponding to the head position (HP). The position information is generated, based on a reproduction signal (servo reproduction signal) including address information reproduced from a servo area 11 just below the head position (HP).

The first controller (feedback control unit C) outputs a feedback (FB) operation value U1 for reducing a positional error (E) between a target track position (RP) and the present track position (TP) corresponding to the head 110-$i$. The second controller (runout suppression/compensation unit F) is a feedforward (FF) compensation unit for compensating the shape of a track on the disk medium 1, or vibration that occurs in synchronism with the rotation of the disk medium. The second controller has a memory table (runout compensation value table) that stores pre-calibrated runout compensation values. The second controller does not normally use the positional error (E), and refers to the memory table based on servo sector information supplied from the signal-processing unit S, thereby outputting, as an FF operation value U2, a runout compensation value corresponding to the servo sector information.

The control process unit CP adds up the outputs U1 and U2 of the first and second controllers, and supplies the addition result as a control value U to the controlled object P (VCM 133). As a result, the head 110-$i$ is driven. The memory table (runout compensation value table) is subjected to a calibration process during the initialization of the disk drive. When the positional error (E) is higher than a preset value, a re-calibration process is started. As a result, the runout compensation values stored in the memory table are updated.

[Off-track Quantity Detection Process in Disk Drive]

A brief description will be given of the process of detecting an off-track quantity (positional error) based on a servo reproduction signal. The disk medium 1 is rotated at a constant rotational speed by the SPM 120. The head 110-$i$ ($i$=0, 1) is elastically supported by the suspension arm 131-$i$ ($i$=0, 1) via a gimbal provided thereon. The head 110-$i$ is designed to float above the disk medium 1, with a fine air gap interposed therebetween by air pressure generated while the disk medium 1 is rotated. Thus, the read element of the head 110-$i$ can detect the leakage flux of the magnetic layers of the disk medium 1 with a constant magnetic gap maintained.

When the disk medium 1 is rotated, the servo areas 11 on the disk medium 1 pass just blow the head 110-$i$ at regular intervals. As a result, servo pattern information on the servo areas 11 is reproduced by the head 110-$i$ at regular intervals. Servo processing can be executed at regular intervals by detecting track position information in the servo pattern information reproduced by the head 110-$i$, i.e., in servo information (servo reproduction signal).

Upon once recognizing a servo address mark (servo area identification code), the HDC 230 can estimate the time at which the next servo area 11 reaches the position just blow the head 110-$i$, since the servo areas 11 pass just below the head 110-$i$ at regular intervals. The HDC 230 asserts a known servo gate signal at the timing at which the preamble section 11A of each servo area 11 passes just below the head 110-$i$, thereby causing the read/write channel IC 220 to start servo processing.

Figure 7:
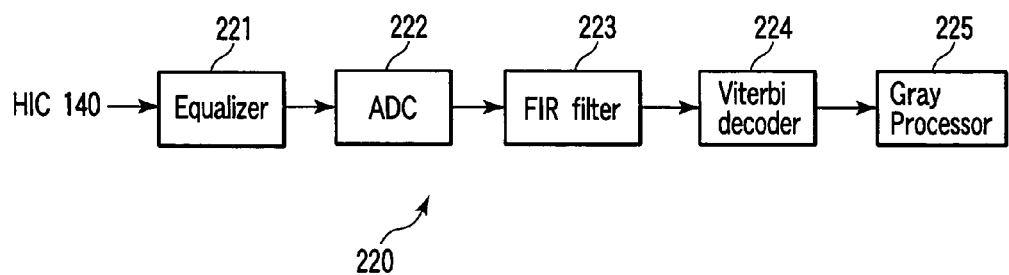
FIG. 7 is a block diagram illustrating the structure of an address detection circuit incorporated in the read/write channel IC 220 appearing in FIG. 5.

Referring now to FIG. 7, the signal processing by the read/write channel IC 220 will be described. FIG. 7 illustrates the structure of an address detection circuit incorporated in the read/write channel IC 220. A reproduction signal generated by the head 110-$i$ and amplified by the HIC 140 is input to the read/write channel IC 220, where it is subjected to an analog filtering process (longitudinal signal equalization process) using an equalizer 221, and then sampled as a digital value using an analog-to-digital converter (ADC) 222.

The leakage flux of the disk medium 1 is a vertically magnetized flux, and each servo pattern is a combination of magnetic portions and non-magnetic portions. However, a DC offset component contained in a reproduction signal from the preamble section 11A is completely removed by the high-pass characteristic of the HIC 140 and the longitudinal signal equalization process by the equalizer 221. As a result, the signal acquired after analog-filtering the reproduction signal from the preamble section 11A using the equalizer 221, i.e., the output of the equalizer 221, is a substantially pseudo sine-wave signal. This signal only differs from that acquired from a conventional vertical magnetic recording disk medium in that its amplitude is ½.

The read/write channel IC 220 switches the process in accordance with the phase of the reproduction signal. Namely, it performs a synchronization acquisition process, address reading process and burst process, etc. In the synchronization acquisition process, a clock signal for reproduction is synchronized with the media pattern cycle. More specifically, in the synchronization acquisition process, the sampling timing of the ADC 222 is synchronized with a sine-wave reproduction signal. In the synchronization acquisition process, AGC processing for adjusting, to a certain level, the amplitudes of signals output from the ADC 222 and indicating digital sample values is performed. In this process, the respective cycles of "1" and "0" of each media pattern is sampled at four points.

In the address reading process, address information (sector/cylinder information) is read. More specifically, in the address reading process, the noise of a signal indicating a series of digital sample values and output from the ADC 222 is reduced by a finite impulse response (FIR) filter 223. Subsequently, the output of the FIR filter 223 is sent to a Viterbi decoder 224, where it is subjected to a Viterbi decoding process based on maximum likelihood estimation. As a result, the reproduction signal reproduced by the head 110-$i$ and amplified by the HIC 140 is decoded into binary data. The resultant binary data is sent to a gray processor 225, where it is subjected to a gray code reverse conversion process, whereby the binary data is converted into address information (sector/cylinder information). Thus, the information on the servo track at which the head 110-$i$ is positioned is acquired.

In the burst process, burst information is acquired by a burst processing circuit (not shown) incorporated in the read/write channel IC 220, and an off-track quantity is detected (calculated) based on the burst information. In the burst process, the amplitudes of signals are sample-held and integrated in the order of bursts (burst signal patterns) A, B, C and D. The burst processing circuit supplies the CPU 240 with voltage values corresponding to the average values of the signal amplitudes of bursts A, B, C and D, and generates a servo interrupt to the CPU 240. Upon receiving the servo interrupt, the CPU 240 sequentially reads the voltage values (burst information) corresponding to the average values of the signal amplitudes of bursts A, B, C and D, using an ADC incorporated in the CPU 240. Based on the read burst information, the CPU 240 calculates the off-track quantity using the DSP. From the off-track quantity and the servo track information acquired in the address reading process, the CPU 240 can accurately detect the servo track position of the head.

[Processing Performed when the Head is Changed]

A description will be given of processing performed when the head is changed from the 110-0 to 110-1 or vice versa. In the disk drive shown in FIG. 5, the head 110-0 is used to reproduce a signal from the recording layer of the upper surface SA of the disk medium 1, while head 110-1 is used to reproduce a signal from the recording layer of the lower surface SB of the disk medium 1. However, in the embodiment, since the upper and lower surfaces SA and SB have different magnetic characteristics, the process performed when the head is changed differs from that in the prior art.

Assume here that it becomes necessary to change a track (target track) to access because of a user's data access request issued from a host system. In this case, the CPU 240 determines in accordance with the control program whether the presently selected head (present head) is identical to the head (target head) corresponding to the to-be-accessed track (target track). If the present head differs from the target head, the CPU 240 shifts to the process performed when the head is changed. In the conventional process during head change, the signal of the HIC 140 processed by the read/write channel IC 220 is switched, whereby a seek process for moving the target head to a target track is started based on track position information read by the target head (the head corresponding to the target track). In contrast, in the embodiment, a process performed during head change differing from the conventional one is performed.

Figure 8:
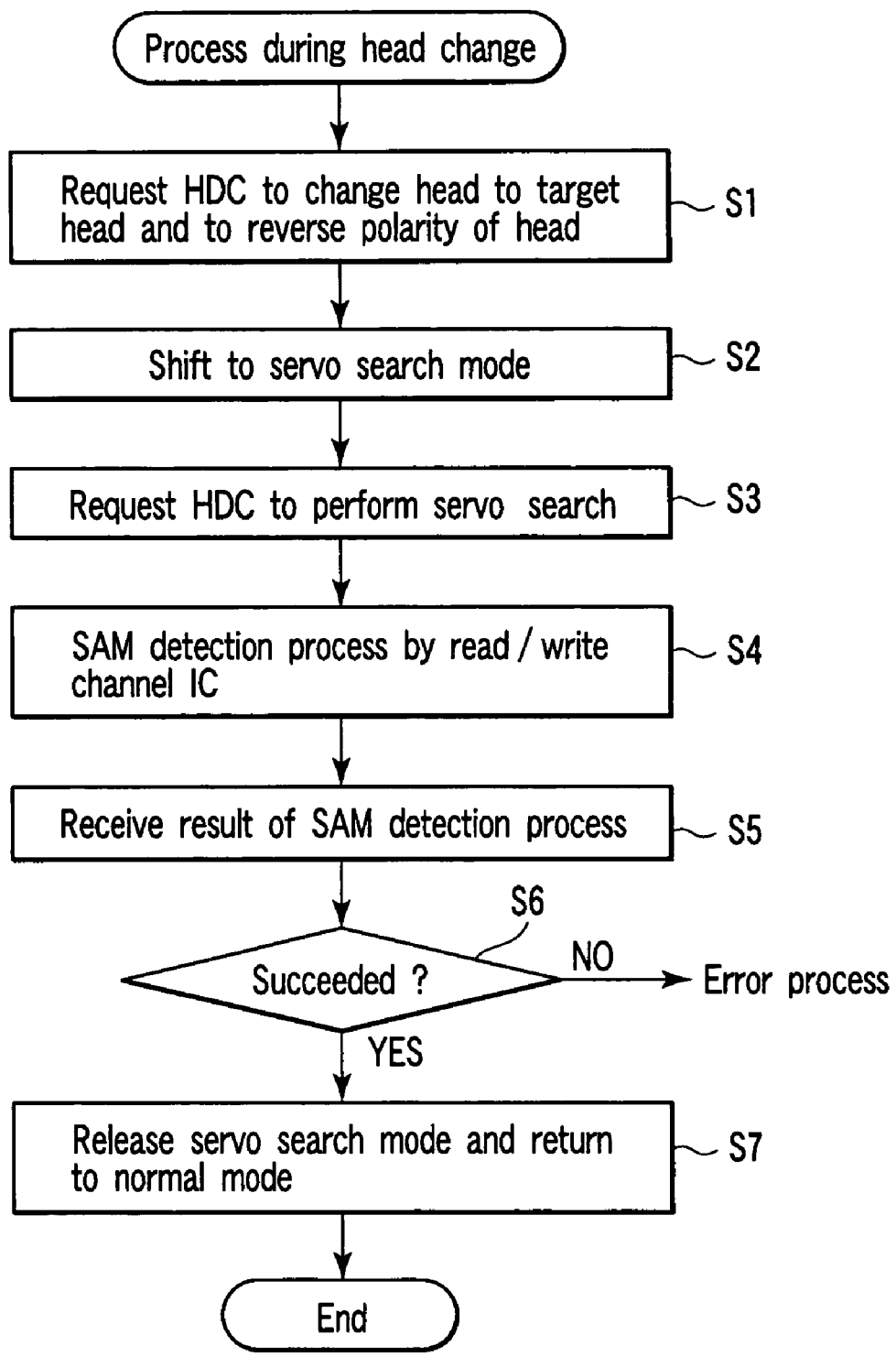
FIG. 8 is a flowchart useful in explaining a process performed for change of a head in the embodiment.

Referring to the flowchart of FIG. 8, the process performed during head change in the embodiment will be described. Firstly, the CPU 240 performs a register operation for the HDC 230, thereby requesting change of the head to the target head and reverse of the head polarity (step S1). The reverse of the head polarity is performed by setting an appropriate polarity corresponding to whether the head number of the target head is an odd or even number. Further, the setting of the head polarity includes reverse of the write polarity for recording, as well as the polarity reverse of a reproduction signal.

After that, the CPU 240 shifts the operation mode from a normal one to a servo search one, and requests the HDC 230 to perform a servo search (steps S2 and S3). The servo search mode is provided for detecting a servo address mark (SAM) embedded in the tip portion of the address section 11B of each servo area 11. From the detected servo address mark, the timing at which the servo areas 11 pass just below the target head 110-$i$ cab be estimated. The servo search mode is used when the servo area passing timing is ambiguous, e.g., when the disk drive is started. Further, the servo search mode is also used in, for example, a recovery process executed when an error (servo lost error), in which the servo areas 11 are not detected at estimated timing, has occurred.

In response to a request from the CPU 240, the HDC 230 sets the polarity of a reproduction signal for the HIC 140, and switches processing signals for the read/write channel IC 220. As a result, a reproduction signal to be processed by the read/write channel IC 220 is switched to the output signal of the HIC 140 corresponding to a signal reproduced by the target head, and the sign of the reproduction signal is reversed. In the disk medium 1 used in the embodiment, their upper and lower surfaces exhibit different leakage flux polarities. However, if the above-described polarity setting is performed, a reproduction signal output from the target head and processed by the read/write channel IC 220 apparently exhibits the same characteristic, regardless of whether the target head is the up or down head.

The read/write channel IC 220 executes SAM (servo address mark) detection on the output signal of the HIC 140 reproduced by the target head and having its polarity reversed appropriately (step S4). The read/write channel IC 220 sends, to the CPU 240 via the HDC 230, a SAM detection result indicating whether the SAM detection has succeeded. Upon receiving the SAM detection result (step S5), the CPU 240 determines from this result whether the SAM detection has succeeded (step S6). If it is determined that the SAM detection has succeeded, the CPU 240 advances the program to step S7, where the CPU 240 performs a register operation for the HDC 230, thereby returning the mode from the servo search mode to the normal mode. In the normal mode, the following servo reproduction process is performed. Firstly, servo pattern information (servo information) is read at regular servo intervals. Based on the read servo pattern information, a head positioning control quantity is calculated. Based on the control quantity, the head 110-*i* is moved to a target track.

[Advantage of Process During Head Change]

In the disk medium 1 used in the embodiment, the upper and lower surfaces exhibit opposite servo pattern polarities. Therefore, if servo information (servo signal) is reproduced without polarity reverse, problems will occur. Namely, since the relationship between "data 1" portions and "data 0" portions is opposite between the upper and lower surfaces of the disk medium 1, the code recorded on the address section 11B will be erroneously recognized. Further, a phase difference of 180 degrees occurs in preamble synchronization, which makes SAM detection itself difficult. Accordingly, it is difficult to reproduce servo information from one of the surfaces of the disk medium 1. In light of this, at least when servo information is reproduced, it is necessary to perform polarity reverse corresponding to the magnetization direction of the one surface of the disk medium 1 (reverse of magnetic polarity for detection).

In the embodiment, the polarity reverse of each head is performed not only when servo information is reproduced, but also when data is written to the data area 12 and read therefrom. In the embodiment, not only reverse of the polarity of a signal (i.e., amplified reproduction signal) output from an amplifier (GMR detection amplifier) incorporated in the HIC 140 is performed (i.e., reverse of magnetic polarity for detection is performed), but also reverse of magnetic polarity for recording. i.e., reverse of the polarity of a recording current supplied to the recording head, is performed. Therefore, concerning the data areas 12, the characteristics are completely identical between the upper and lower surface of the disk medium 1, and hence there is no error rate difference therebetween, for example. In other words, the relationship between the arrangement of user data "1" and "0" and the magnetization direction of the recording layer is merely opposite between the upper and lower surface of the disk medium 1. Therefore, no problem will occur even when the above-described processing of the embodiment is performed.

In contrast, assume that the current polarity of the recording head is not reversed. In this case, "data 1" and "data 0" portions in each data area and the magnetization direction of the recording layer on the upper surface side of the disk medium 1 correspond to those on the lower surface side. However, during data reading, whenever information is reproduced from each data area 12 and servo area 11, polarity reverse must be iterated on one surface side of the disk medium 1. This is not desirable since it makes the processing of the control program by the CPU 240 complex, and much time is required for responses to magnetic reverse processing. However, the process performed during head change in the embodiment is a very simple process and can deal with the disk medium 1 in which the magnetization direction of each servo area 11 differs between the upper and lower surfaces.

In addition, in the process performed during head change, SAM detection (SAM search) processing is performed. The reliability of servo information acquired from normal servo reproduction processing is higher than that acquired from SAM detection processing. However, problems will occur if a phase error exists between corresponding servo areas (servo sectors) of the upper and lower surface of the disk medium 1. Assume here that servo information is written (servo track writing is performed) with the disk medium installed in the HDA, like the conventional magnetic disk medium. In this case, even if head change is performed, there is little danger of failure in SAM detection since the traverse timing of servo sectors is maintained. Since, however, the upper and lower patterns of the disk medium 1 of the embodiment are formed by transfer using different stampers, synchronized preamble sampling and hence SAM detection may well fail, even if the upper and lower surfaces are rather satisfactorily aligned.

In general, when the CPU 240 has failed in reading of servo information performed at regular intervals, it executes retry processing. If retry processing has also failed, the CPU 240 determines that a servo lost error has occurred. At this time, the CPU 240 shifts to recovery SAM detection. This complex process, however, leads to degradation of access performance during head change. In contrast, in the embodiment, SAM detection is executed at the beginning when head change is performed. This prevents degradation of the access performance of the disk drive provided with the disk medium 1 in which it is difficult to prevent misalignment in phase between the servo areas of the upper and lower surfaces.

As described above, in the patterned disk medium 1 employed in the embodiment, magnetic members 3A and 3B forming servo patterns are provided on the upper and lower surfaces SA and SB, respectively. The direction of magnetization detected at the surfaces of the magnetic members 3A is opposite to that detected at the surfaces of the magnetic members 3B. When the thus-constructed disk medium 1 is mounted in a disk drive, high density recording can be realized. Further, initialization processing, such as servo track writing, on the disk medium 1 can be omitted. This being so, the productivity of disk drives can be enhanced, and the manufacturing cost of the disk drives can be significantly reduced.

In the above-described process during head change, both the magnetic polarity for detection and that for recording are simultaneously reversed. Alternatively, during head change, only the magnetic polarity for detection may be reversed. In this case, there is no problem in reproduction of servo information, but ingenuity is required to read data from each data area 12. Namely, during reading, magnetic polarity reverse must be iterated whenever data is read from each data area 12 and servo area 11 on one of the surfaces of the disk medium 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disk drive comprising:
a patterned disk medium for vertical magnetic recording, the patterned disk medium including
a disk-shaped flat substrate including a first surface and a second surface located an opposite side of the first surface;
first servo pattern areas provided on the first surface of the substrate and each including portions provided with magnetic members and portions provided with no magnetic members, the magnetic members of the first servo pattern areas being magnetized in a direction perpendicular to the first surface and the second surface; and
second servo pattern areas provided on the second surface of the substrate and each including portions provided with magnetic members and portions provided with no magnetic members, the magnetic members of the second servo pattern areas being magnetized in a same direction as the direction of magnetization of the magnetic members of the first servo pattern areas, a magnetic polarity of surfaces of the magnetic members of the second servo pattern areas being different from a magnetic polarity of surfaces of the magnetic members of the first servo pattern areas;
a first head located, corresponding to the first surface of the disk medium;
a second head located, corresponding to the second surface of the disk medium; and
a main controller configured to control change from the first head to the second head, and change from the second head to the first head, the main controller also controlling, during the head change, reverse of polarity of a signal reproduced by a changed one of the first head and the second head, wherein during the head change, the main controller is configured to set a servo search mode which enables timing of passing of servo pattern areas just below the changed head to be estimated, the servo pattern areas being included in the first servo pattern areas and the second servo pattern areas and corresponding to the changed head.

2. The magnetic disk drive according to claim 1, wherein:
servo information determined from a combination of magnetic portions and non-magnetic portions is embedded in each of the first servo pattern areas and the second servo pattern areas, the servo information including a servo area identification code; and
the servo area identification code is detected in the servo search mode.

* * * * *